United States Patent [19]

Erlichman

[11] 4,188,105
[45] Feb. 12, 1980

[54] BATTERY CONTAINING FILM CASSETTE WHEREIN REMOVAL OF LAST SHEET INSULATES CONTACTS

[75] Inventor: Irving Erlichman, Wayland, Mass.
[73] Assignee: Polaroid Corporation, Cambridge, Mass.
[21] Appl. No.: 957,978
[22] Filed: Nov. 6, 1978
[51] Int. Cl.² ...................... G03B 17/26; G03B 19/10
[52] U.S. Cl. .................................. 354/202; 354/275; 430/496
[58] Field of Search ...................... 96/200, 201, 76 C; 354/83, 174, 275, 84–87, 202

[56] References Cited

U.S. PATENT DOCUMENTS

| | | | |
|---|---|---|---|
| 3,798,669 | 3/1974 | Bachelder | 354/174 |
| 3,988,755 | 10/1976 | Vogel | 354/275 |

Primary Examiner—L. T. Hix
Assistant Examiner—Shelley Wade
Attorney, Agent, or Firm—Alfred E. Corrigan

[57] ABSTRACT

A photographic film assemblage including a film cassette for housing a battery and a plurality of sheet-like members including several film units. A wall of the cassette is provided with a pair of apertures to enable a pair of contacts in a camera to electrically engage the terminals of the battery. An elongate strip of dielectrical material having a pair of openings therein has one of its ends attached to the last of the sheet-like members to be removed from the film cassette and the pair of holes located between and in alignment with the battery terminals and the pair of apertures. The elongate strip follows the last sheet-like member as it is removed from the film cassette during an exposure cycle thereby moving the pair of openings out of alignment with the battery terminals and the apertures while simultaneously moving a portion of the dielectric material between the battery terminals and the pair of apertures to electrically insulate the battery from the contacts. Alternative embodiments of the invention are also disclosed.

21 Claims, 6 Drawing Figures

BATTERY CONTAINING FILM CASSETTE WHEREIN REMOVAL OF LAST SHEET INSULATES CONTACTS

BACKGROUND OF THE INVENTION

1. Field of the Invention

This invention relates to a photographic film assemblage including a film cassette for housing a battery and a plurality of sheet-like members including several film units, and more particularly to means for electrically insulating the battery terminals from engagement by a pair of camera mounted contacts in response to removing the last sheet-like member from the film cassette.

2. Description of the Prior Art

Manufactures of photographic equipment are continually striving to automate certain functions which were previously performed by the user of the equipment. One such example is providing a disposable film assemblage with its own fresh battery thereby relieving the user of the task of having to remember to replace the camera's battery at certain intervals. This type of film assemblage includes a film cassette containing a battery and a stack of sheet-like members including several film units. A wall of the film cassette is provided with a pair of apertures to which the terminals of the battery are adapted to be aligned with in order that the contacts of a camera may extend into the apertures and electrically engage the battery terminals. However, exposing the battery terminals in this manner creates a situation wherein an electrical circuit may be accidently established across the battery terminals after the film cassette containing the battery is removed from the camera. To obviate this problem several solutions have been proposed. In U.S. Pat. No. 3,798,669 the proposal entails covering the apertures of the film cassette with masks which are displacable by the camera's contacts upon the loading of the film cassette into the camera. Another proposal, set forth in U.S. Pat. No. 3,988,755, involves the positioning of an insulation strip within the film cassette, which strip is automatically moved out of its insulating position upon insertion of the film cassette into the camera and returns it to its original insulating position upon removal of the film cassette from the camera. But, since the user no longer has to remember to replace the battery, he now may have a tendency to forget it completely. Accordingly, he may, after exposing all of the film units in the film cassette, place the camera containing the film-less cassette in the closet for a prolonged period of time. During this period of inactivity, the battery may develop a leak thereby releasing corrosive materials which may seep through the apertures in the film cassette and run onto the contacts in the camera. Obviously, if this leakage is not noticed in time, the camera contacts will be damaged. Therefore, it is not only important to seal off the apertures in the cassette prior to its removal from a camera; it is also beneficial to seal these apertures substantially immediately after the last film unit within the film cassette has been exposed and removed from the film cassette during a photographic exposure cycle.

SUMMARY OF THE INVENTION

The instant invention relates to a photographic film assemblage having an internal power supply which is automatically electrically disengaged from a pair of electrical contacts located within a camera upon the last sheet-like member, e.g., a film unit, being removed from the assemblage during a photographic cycle. The film assemblage includes a film cassette having an exposure opening through which a film unit is adapted to be exposed, an egress opening through which a sheet-like member, e.g., a film unit, is adapted to be moved to the exterior of the film cassette, an ingress opening through which a portion of a camera mounted film advancing apparatus is adapted to extend prior to moving one of the sheet-like members out of the film cassette via the egress opening, and a pair of apertures through which a pair of camera contacts are adapted to extend to make electrical engagement with the terminals of a battery located within the film cassette.

A plurality of sheet-like members are stacked within the film cassette for sequential removal from the cassette via the egress opening. Preferably, these members include a plurality of film units of the self-developing type and a dark slide for preventing premature exposure of the film units to the ambient light during loading of the film cassette into a camera. The stack of sheet-like members is resiliently urged against the cassette wall having the exposure opening therein by a platen. In turn, the platen is mounted above a generally flat battery such that it urges the battery into a position wherein its terminals are located in alignment with the pair of apertures in the film cassette. A first end of an elongate strip of dielectric material is releasably secured to an end of the lowermost film unit in the stack, i.e., the last sheet-like member to be removed from the film cassette during a camera cycle. The elongate strip extends from the film unit to a position between the battery and the apertured wall. The elongate strip is provided with a pair of openings which, originally, are located between and in alignment with the battery terminals and the pair of apertures.

The film assemblage is adpated for use with a camera of the self-developing type. The camera includes a film chamber for locating the film cassette in position for the exposure of a film unit, a pair of juxtaposed rollers for spreading a processing liquid across an exposed photosensitive element of a film unit, a film advancing apparatus, an electrical motor for driving at least one of the rollers and the film advancing apparatus, and an electrical circuit including a pair of contacts which are mounted in position to engage the battery terminals upon locating the film cassette within the film chamber thereby electrically connecting the battery to the motor. Subsequent to the exposure to the last film unit in the film cassette, the motor is energized to enable the film advancing apparatus to move the exposed film unit out of the cassette and into the bite of the rollers. The rollers continue the movement of the exposed film unit out of the cassette while simultaneously rupturing a container of processing liquid associated with a leading end of the film unit and spreading its contents across the film unit to initiate the formation of a visible image therein. During this movement the first end of the elongate strip follows the moving film unit by virtue of its attachment thereto. However, the portion of the elongate strip having the pair of openings therein does not move at this time because of a first slack portion of strip located between the pair of openings and the first end of the strip attached to the last film unit. After the trailing end of the exposed film unit has moved out of engagement with the rollers and the first end of the strip is now being advanced by the rotating rollers, the slack in the first slack portion of the strip is fully taken up and further movement of the attached end of the strip is transmitted to that portion containing the pair of openings. This latter movement is effective to move the openings in the elongate strip out of alignment with the apertures in the film cassette and the battery terminals while simultaneously moving the dielectrical material of the elongate strip between the apertures and the terminals thereby switching off the motor to end the drive to the roller.

The elongate strip includes a second slack portion located between the openings in the strip and a second end of the strip. The second end of the elongate strip is secured to the battery such that after the slack has been removed from the second portion of the strip, during the movement of the strip's openings into the non-aligned position, the first end of the strip may be manually pulled to facilitate the removal of the film cassette from the film chamber. In an alternative embodiment, the second end of the elongate strip is fixedly secured to the battery such that after a predetermined portion of the elongate strip has passed between the rollers further movement thereof is transmitted to the battery to move it to a position wherein its terminals are no longer located in alignment with the apertures in the film cassette. In still another embodiment of the invention, one side of the elongate strip of dielectric material is provided with an electrically conductive member which is adapted to be moved into engagement with the terminals of the battery at substantially the same time that the dielectrical material insulates the terminals from the contacts.

An object of the invention is to provide a photographic film assemblage including a film cassette housing a battery and a plurality of sheet-like members with means for electrically disconnecting the terminals of the battery from an exteriorly located circuit in response to the removal of the last sheet-like member from the film cassette.

It is another object of the invention to provide a photographic film cassette with at least one aperture through which a pair of contacts may extend into the film cassette to engage the terminals of a battery located therein, which aperture is adapted to be covered in response to the movement of the last film unit from the film cassette thereby electrically insulating the terminals from the contacts.

It is still another object of the invention to provide a photographic film assemblage including a film cassette having a battery located therein with means for moving the battery to a location within the film cassette whereat its terminals cannot be engaged by a pair of camera mounted contacts, such movement occurring after the last film unit in the film cassette has been removed therefrom.

It is still another object of the invention to provide a photographic film assemblage of the type including a film cassette having therein a battery and a plurality of sheet-like members including at least two film units with means for simultaneously electrically shorting the terminals of the battery and electrically insulating the terminals from a pair of exteriorly mounted contacts in response to the removal of the last sheet-like member from the film cassette.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
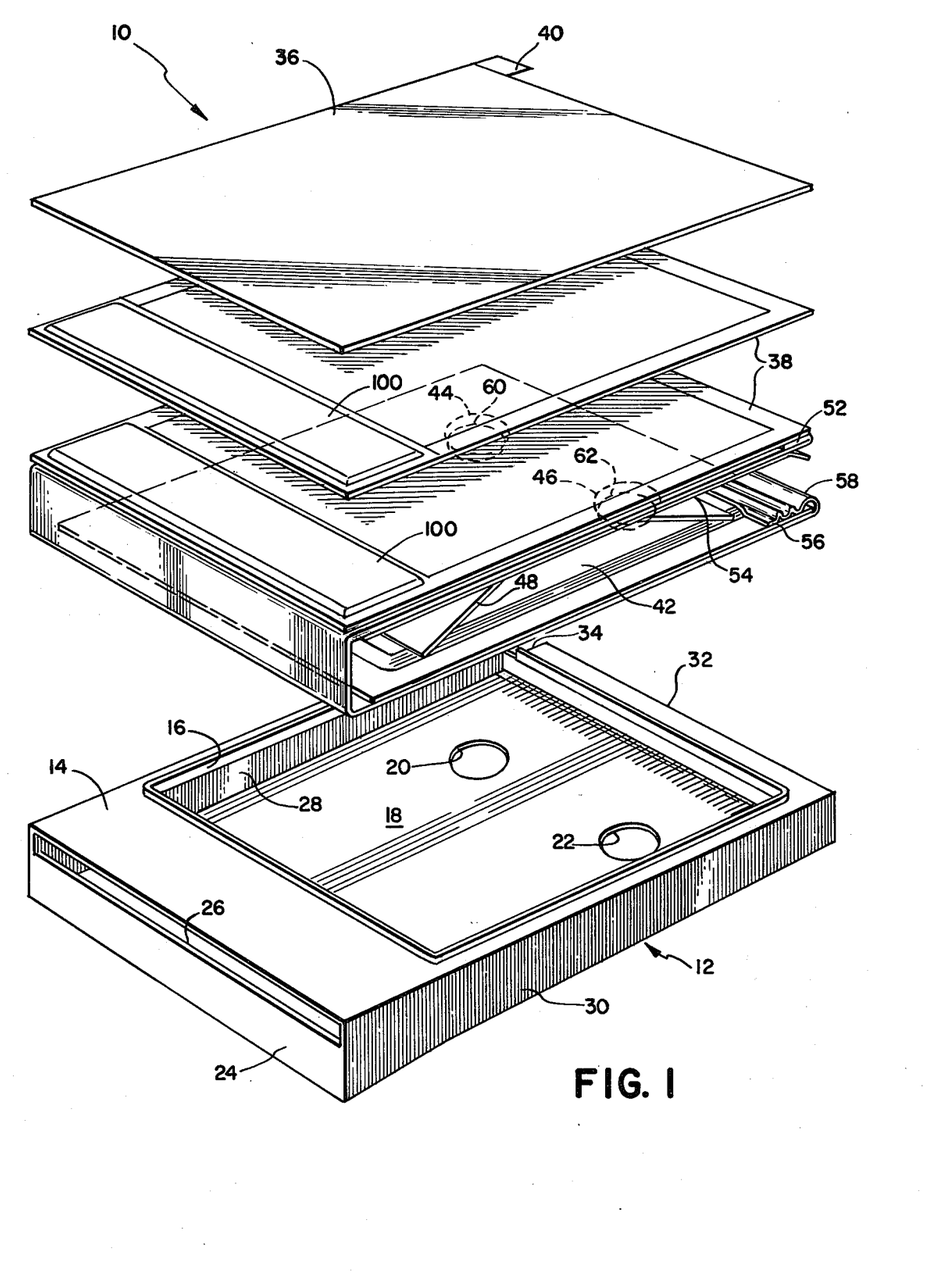
FIG. 1 is an exploded perspective view of a film assemblage.

Reference is now made to FIG. 1 of the drawings wherein is shown a preferred embodiment of a photographic film assemblage 10. The film assemblage 10 includes a film cassette 12 formed from any suitable opaque material. The film cassette 12 includes a forward wall 14 having an exposure opening 16 therein, a rear wall 18 having a pair of apertures 20 and 22 therein, a leading end wall 24 having an egress opening 26, a pair of side walls 28 and 30, and a trailing end wall 32. An ingress opening 34 extends along a portion of the forward wall 14 and part way down the trailing end wall 32. Positioned within the film cassette 12 are a plurality of sheet-like members including a cover sheet or dark slide 36 formed from any suitable opaque material for preventing premature exposure of a film unit during the loading of the assemblage into a camera and several film units 38 (preferably ten) only two of which are shown. The trailing end of the dark slide is provided with a flexible strip of opaque material 40 for initially light sealing the ingress opening 34. The film assemblage 10 further includes a generally thin flat battery 42 having a pair of terminals 44 and 46, and a resilient platen 48. The platen 48 provides a means for resiliently urging the film units 38 toward the exposure aperture 16 while simultaneously urging the battery 42 towards the interior surface of the rear wall 18 such that the battery terminals 44 and 46 are in alignment with the apertures 20 and 22, respectively. An elongate strip of dielectric material 50 is coupled to the last sheet-like member to be removed from the film cassette 12. Specifically, the elongate stripe includes a first end 52 which is releasably secured near a trailing end of the lowermost film unit 38 in the stack of sheet-like members. The strip 50 extends a short distance toward the trailing end of the film unit 38 and then is doubled back upon itself to form a first slack portion 54 which extends to a point closely adjacent to the leading end wall 24 of the film cassette 12. From this point, the strip 50 then extends downwardly and then rearwardly between the under surface of the battery 42, i.e., the surface having the terminals 44 and 46, and the interior surface of the rear wall 18. Finally, the strip 50 extends around the trailing end of the battery (right hand end as viewed in the drawings) and has its second end 56 fixedly secured to an upper surface of the battery 42. Just short of the second end 56 of the elongate strip 50 is a second slack portion 58 whose function will be explained hereinafter. The strip is also provided with a pair of openings 60 and 62 which originally are located between and in alignment with the battery terminals 44 and 46 and the apertures 20 and 22 in the rear wall 18 of the film cassette 12.

The film assemblage 10 is adapted to be used in a camera of the self-developing or instant type, only a portion of which is shown at 64. Specifically, the portion 64 includes a housing 66 which defines a film chamber 68 having an open end 70 through which the film cassette 12 may be slidably inserted into or removed from the film chamber 68. Mounted within the housing 66 is an electric motor 72, a spring 74 for resiliently urging the film cassette 12 into position for the exposure of the uppermost film unit 38 in the stack, and a pair of electrical contacts 76 (only one of which is shown) which are suitably wired to the motor 72. Each of the contacts 76 includes an apex 78 which is adapted to extend through one of the apertures 20 and 22 and through one of the openings 60 and 62 in the elongate strip 50 so as to make electrical engagement with one of the battery terminals 44 and 46.

Figure 2:
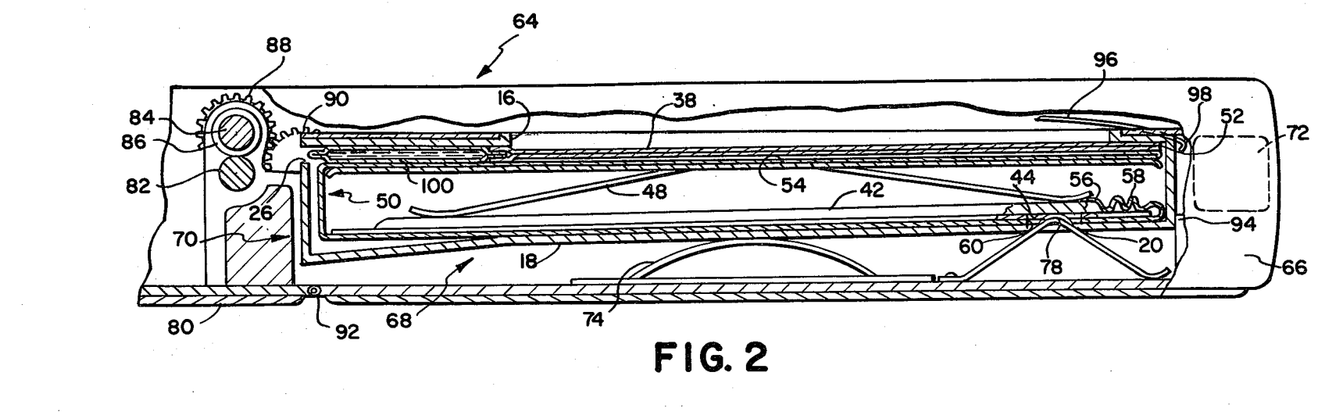
FIG. 2 is a side elevational view of the film assemblage of FIG. 1 located within a camera, portions of the camera being omitted for reasons of clarity.
Figure 3:
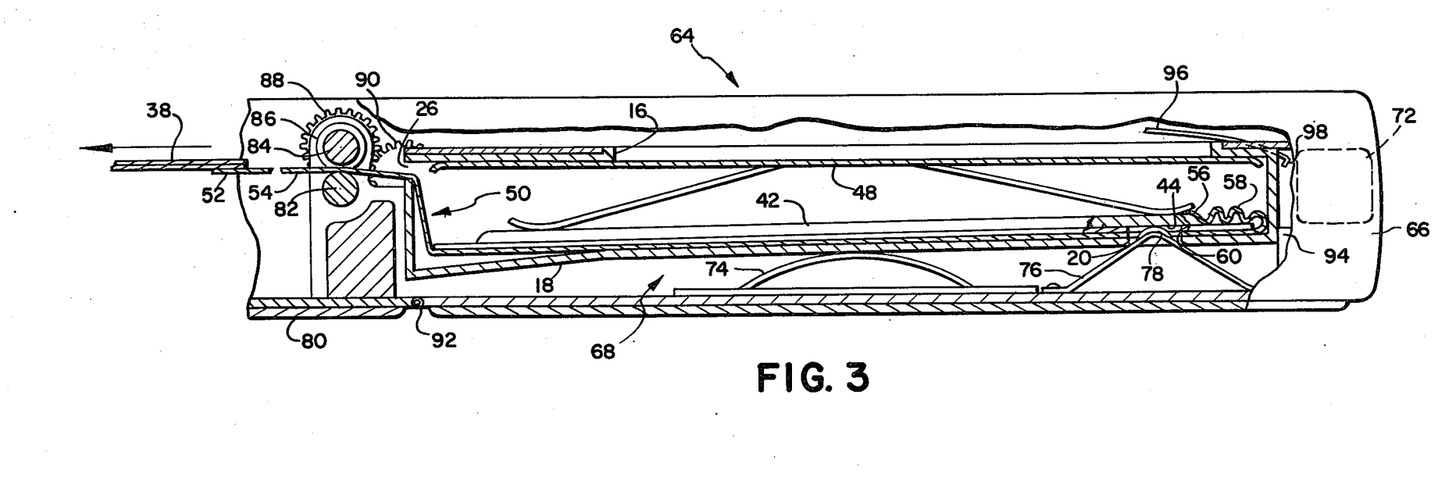
FIG. 3 is a view similar to FIG. 2 showing the last sheet-like member removed from the film cassette and about to move out of engagement with the camera's spread rollers.

Extending across the open end 70 of the film chamber 68 is a spread roller housing, a portion 80 of which is shown in FIGS. 2-5. Mounted within the housing portion 80 is a pair of juxtaposed elongate rollers 82 and 84. The roller 84 includes an annular shoulder 86 at each end thereof which is adapted to engage the underlying surface of the roller 82 so as to establish a predetermined gap between the rollers 82 and 84. Also, one end of the roller 84 is provided with a drive gear 88 which is adapted to be coupled to a motor driven gear train by an idler gear 90. The housing 80 is pivotally connected to the housing 66 by a hinge pin 92 for movement from its operative position, as shown in FIGS. 2 and 3, wherein the rollers 82 and 84 are located in position to receive an exposed film unit as it exits from the film cassette 12, to an unoperative position, as shown in broken lines in FIG. 4, wherein a film cassette may be inserted into or removed from the film chamber 68.

Figure 4:
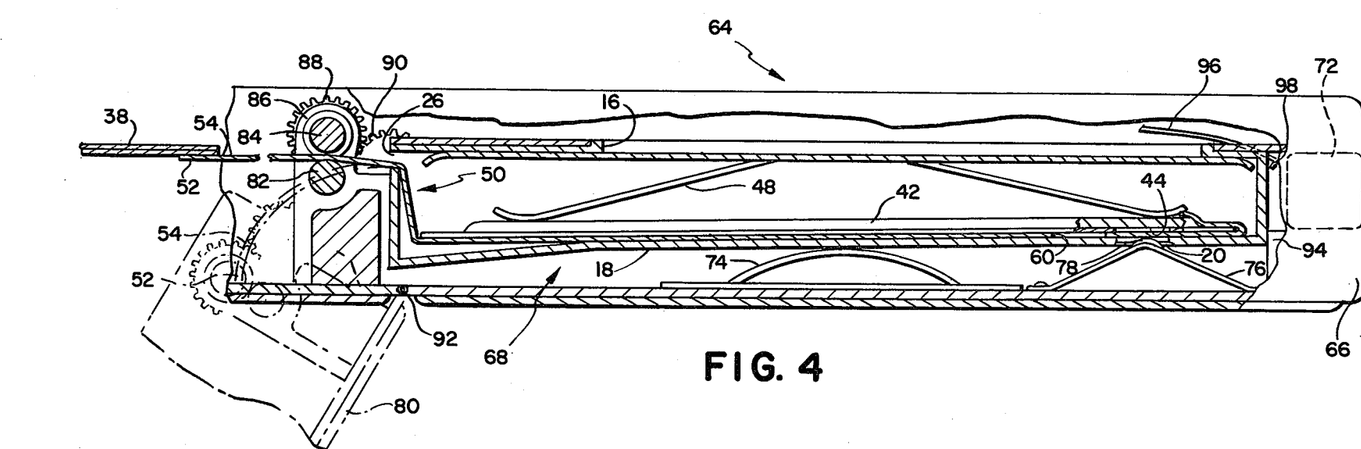
FIG. 4 is a view similar to FIG. 3 showing the relationship between the various elements of the film assemblage and the camera just subsequent to electrically isolating the battery terminals from the camera's contacts.

With the spread roller housing 80 located in the broken line position, as shown in FIG. 4, the film cassette 12 is inserted, trailing end wall 32 first, into the film chamber 68 via the open end 70 until the trailing end wall contacts a stop 94. At this location, the apex 78 of each of the contacts 76 extends into the film cassette to make engagement with the terminals 44 and 46 of the battery 42. The spread roller housing 80 is then rotated into its solid line position and secured therein by a latch (not shown). The motor 72 is then energized to drive a film advancing member, shown schematically at 96, to move its downwardly turned end 98 into the ingress opening 34 and into engagement with the trailing edge of the dark slide 36. The film advancing member 96 moves the dark slide 36 out of the film cassette 12 via the egress opening 26 and into the gap between the rollers 82 and 84. The rollers, by virtue of their connection to the motor 72 via the gear train (not shown) and the idler gear 90, continue the movement of the dark slide 36 away from the film cassette 12 and towards the exterior of the camera where it may by manually grasped and fully removed from the camera. The camera is now ready to take its first photographic exposure. After all but one of the film units 38 have been exposed, the various members of the film assemblage 10 appear as shown in FIG. 2. The single film unit 38 remaining in the film cassette 12 now represents the last of the sheet-like members to be removed from the film cassette 12. Subsequent to the exposure of the last film unit 38, motor 72 is electrically coupled to the battery 42 by a suitable electronic circuit so as to drive the film advancing member 96 and the spread roller 84. The film advancing member 96 moves the leading end of the exposed film unit 38 into the gap between the spread rollers 82 and 84. The rollers continue the advancement of the exposed film unit towards the exterior of the camera while simultaneously rupturing a container of processing liquid 100 attached to the leading end of the film unit and spreading its contents between predetermined layers of the film unit to initiate the formation of a visible image within the exposed film unit. As the exposed film unit 38 is advanced by the rollers, the slack in the first slack portion 54 is gradually taken up unitl you reach the point depicted in FIG. 3. In this figure, the exposed film unit has moved out of engagement with the rollers 82 and 84 and the slack in portion 54 of the elongate strip 50 has not only been fully taken up but it, the portion 54, is now being advanced by the rollers 82 and 84. As can readily be seen in FIG. 3, further advancement of the portion 54 of the elongate strip 50 is transmitted to the remainder of the strip 52 thereby advancing the openings 60 and 62 to the left, where they are no longer located in alignment with the battery terminals 44 and 46 and with the apertures 20 and 22, while simultaneously moving the dielectric material of the strip 50 between the battery terminals 44 and 46 and the apertures 20 and 22 thereby electrically insulating the battery terminals 44 and 46 from the contacts 76 and stopping the motor 72. The slack in the second slack portion 58 allows for the movement of the portion of the strip 50 containing the openings 60 and 62 while still maintaining the connection between the battery 42 and the second end of the elongate strip 50. Thus, with the drive to the roller 84 stopped, the various elements assume the positions shown in FIG. 4 wherein the apertures 20 and 22 are sealed off by the strip of dielectric material 50. The user of the camera now removes the exposed film unit from the end 52 of the elongate strip 50 and, because he knows that there are no other film units in the film cassette because only the last film unit is connected to the elongate strip, sets the camera aside. During the time interval between the exposure of the last film unit and the removal of the film cassette 12 from the camera, the camera contacts 76 are protected from damage by any corrosive materials that may leak from the battery 42 and exit from the film cassette 12 via the apertures 20 and 22 by reason of the apertures 20 and 22 being essentially sealed by the dielectric material. The dielectric material of the strip 50 may be impregnated with any suitable alkaline material, e.g., sodium bicarbonate, for neutralizing any leakage materials. Since the resilient force of the platen 48 maintains the battery 42 in the position shown in FIG. 4, it can readily be seen that the apertures 20 and 22 remain sealed even after the film cassette 12 has been removed from the camera and discarded. At the end of this time interval, which may be as long as several months, the spread roller housing 80 is rotated in a counterclockwise direction into the broken line position shown in FIG. 4. It will be remembered that prior to rotating the spread roller housing 80 into loading or unloading position, the portion 54 of the elongate strip 50 is still located between the spread rollers 82 and 84. Since the second end 56 of the elongate strip is still attached to the battery 42, rotation of the spread roller housing 80 into the broken line position results in relative movement between the spread rollers 82 and 84 and the portion 54 of the elongate strip 50 until the housing reaches the broken line position shown in FIG. 4 where the first end 52 finally emerges from the inboard side of the rollers 82 and 84. So positioned, the user may now grasp the portions 54 and pull on it so as to remove the film cassette 12 from the film chamber 68.

Figure 5:
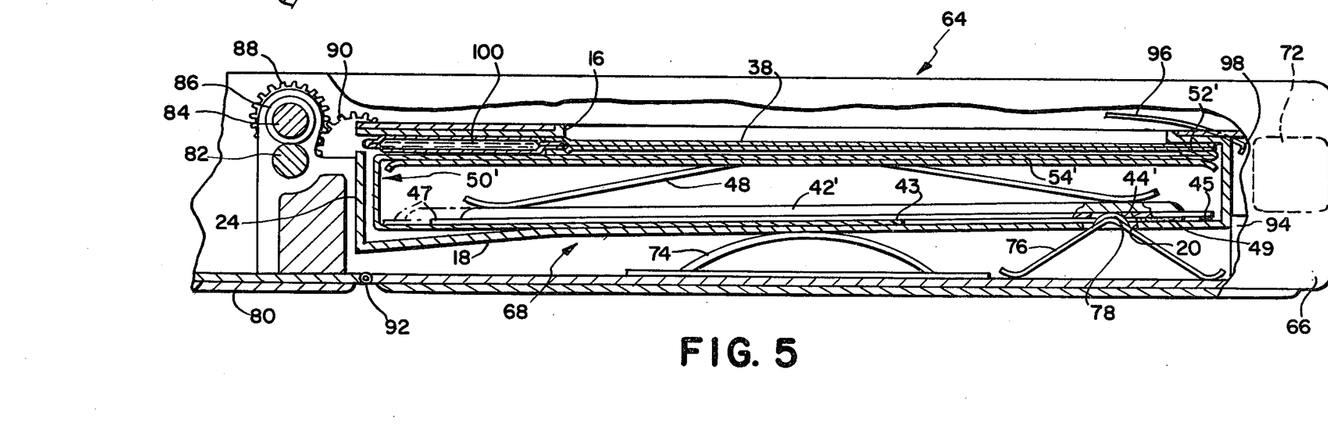
FIG. 5 is a view similar to FIG. 3 showing an alternative embodiment of the invention.

Reference is now made to FIG. 5 of the drawings wherein is shown an alternative embodiment of the invention. This embodiment has two basic changes from the preferred embodiment, namely (1) the battery 42' is shorter than the battery 42, and (2) the elongate strip 50' no longer extends to a position between the terminals of the battery and the apertures 20 and 22. Specifically, the elongate strip 50' has one of its ends 52' releasably attached to an end of a film unit 38. The strip 50' extends rearwardly and then forwardly to define a slack porton 54' which approaches the leading end wall 24 of the film cassette 12 where it turns downwardly about the left hand edge of the platen 48. Next, the elongate strip 50' extends under the battery 42' to a point 43 where it is fixedly secured to the battery 42'. The battery 42' is releasably secured at 45 to the bottom wall 18 of the film cassette 12 such that its terminals 44' (only one being shown) are in alignment with the apertures 20 and 22. FIG. 5 depicts the correlation between the various elements prior to the exposure of the last film unit 38 in the film cassette. After the last film unit 38 has been exposed, a switch (not shown) is closed to connect the motor 72 to the battery 42'. The motor 72 then drives the film advancing member 96 and the roller 84, as previously described. When the exposed film unit 38 gets to a position corresponding to that shown in FIG. 4., further advancement of the portion 54' by the rollers 82 and 84 is transmitted to the end 43 with sufficient force to overcome the securement at 45 and allow the advancing strip 50' to move a leading edge 47 of the battery to the broken line position thereby moving the battery terminals 44' out of engagement with the contacts 76 while simultaneously moving a pad 49 across the apertures 20 and 22. The pad 49 is secured to the underside of the battery 42' and is impregnated with any suitable alkaline material for neutralizing any battery leakage that may be in the vicinity of the apertures 20 and 22. As in the preferred embodiment, when the spread roller housing is eventually moved into the film cassette unloading position, the portion 54' automatically moves out of engagement with the rollers 82 and 84 and may be manually grasped to facilitate the removal to the film cassette 12 from the film chamber 68.

Figure 6:
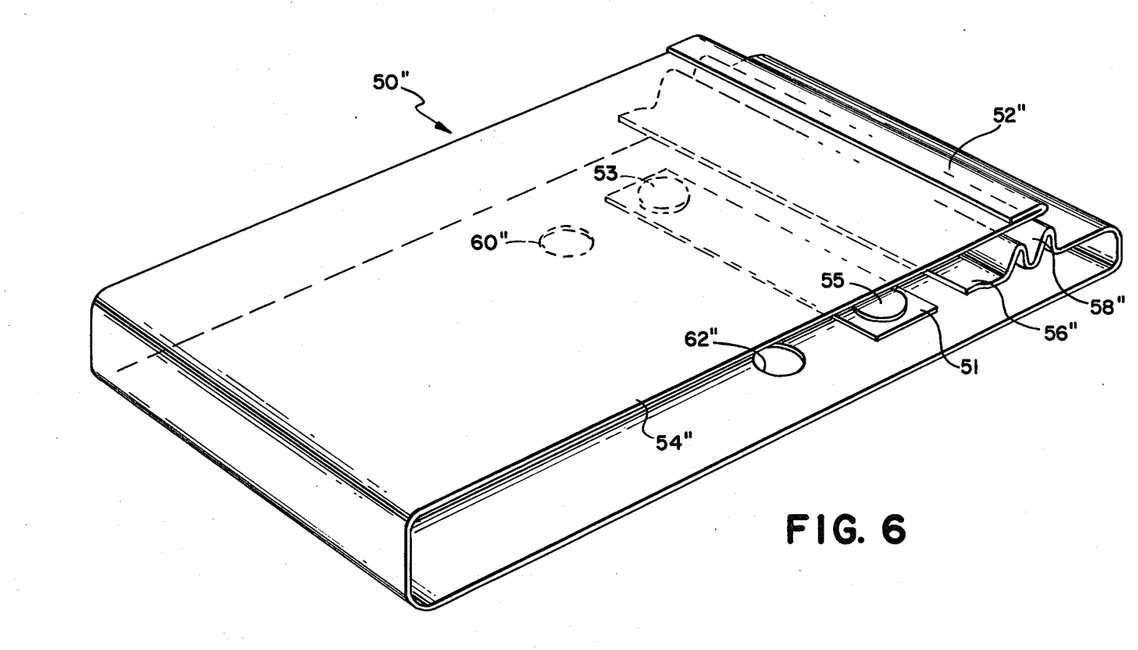
FIG. 6 is a perspective view of an alternative form of an elongate connecting strip.

Reference is now made to FIG. 6 of the drawings wherein is shown a modified form of the elongate strip 50 described above with reference to the preferred embodiment. In this embodiment, the elongate strip of dielectric material 50" is substantially identical to the strip 50 except for the addition of a strip of electrical conductive material just to the right of the opening 60" and 62". More particularly, the elongate strip 50" includes a first end 52" which is adapted to be releasably secured to an end of the last film unit 38 in the stack, a first slack portion 54", a pair of openings 60" and 62", a second slack portion 58", a second end 56" adapted to be fixedly secured to the battery 42, and a strip 51 of electrically conductive material having raised portions 53 and 55 secured to the surface of the elongate strip 50" which will face the battery terminals 44 and 46. As in the preferred embodiment the openings 60" and 62" are originally located in alignment with the apertures 20 and 22. When the last film unit is removed from the film cassette 12 and the slack in portion 54" has run out or been taken up, further advancement of the strip 50" by the rollers 82 and 84 is effective to move the openings 60" and 62" out of alignment with the battery terminals 44 and 46 and the apertures 20 and 22 while simultaneously moving the raised portions 53 and 55 of the electrically conductive strip 51 into engagement with the terminals 44 and 46. This latter action electrically shorts the battery 42 while simultaneously electrically insulating the terminals from contact by a member exterior of the film cassette.

Obviously the shorting of the battery terminals, as described above, must be done in a safe manner. For example, if the capacity of the battery is 200 watts seconds, it has been calculated that providing the strip 51 with a resistance of 50 ohms will substantially discharge the battery 42 in 4.6 minutes while only generating $\frac{3}{4}$ of a watt.

Since certain changes may be made in the above described film assemblages without departing from the scope of the invention herein involved, it is intended that all matters contained in the above description or shown in the accompanying drawings shall be interpreted as illustrative and not in a limiting sense. For example, the second end of the elongate strip need not be attached to the battery in the embodiments shown in FIGS. 1–4 and 6 if the elongate strip is not to be used to facilitate the withdrawal of the film cassette from the film chamber. Further, the last sheet-like member to be removed from the film cassette need not be a film unit. For example, it may be a sheet containing instructions for ordering prints of the photographs. Still further, the second end of the elongate strip in FIGS. 1–4 and 6 may be fixedly secured to an interior surface of the film cassette or to the platen rather than to the battery.

What is claimed is:

1. A photographic film assemblage comprising:
   a film cassette having means for defining an exposure opening through which a film unit is adapted to be exposed, means defining an egress opening through which an exposed film unit is adapted to be advanced from the film cassette subsequent to exposure, and at least one aperture through which a pair of electrical contacts in a camera may extend so as to engage the terminals of a battery located within the film cassette;
   a plurality of sheet-like members including several film units located within said film cassette;
   a battery including a pair of terminals located within said film cassette with said terminals being located adjacent to and in alignment with said at least one aperture; and
   means coupled to the last of said sheet-like members to be moved from said cassette via said egress opening when located within the camera for electrically insulating said terminals from the camera contacts in response to the movement of said last sheet-like member from said film cassette.

2. A film assemblage as defined in claim 1 wherein said last of said sheet-like members is one of said film units.

3. A film assemblage as defined in claim 2 wherein said means coupled to said one film unit includes a section of dielectric material which is movable between said battery terminals and said at least one aperture in response to the movement of said one film unit through a predetermined distance relative to said film cassette.

4. A film assemblage as defined in claim 2 wherein said means coupled to said one film unit includes an elongate strip having a first portion formed from a dielectric material and a second portion having at least one opening therein which is originally located between said battery terminals and said at least one aperture so as to enable the camera contacts to electrically engage said battery terminals when said film assemblage is located within the camera, said elongate strip being movable in response to the movement of said one film unit through a predetermined distance to displace said at least one opening from its position between said battery terminals and said at least one aperture and to thereafter position said first portion of said elongate strip therebetween thereby electrically insulating said battery terminals from the contacts in the camera.

5. A film assemblage as defined in claim 2 wherein said means coupled to said one film unit includes as elongate strip having one end releaseably secured to said one film unit and its opposite end fixedly secured within said film cassette, said elongate strip having a length such that movement of said one film unit out of said film cassette moves said one end of said elongate strip to a location exteriorly of said film cassette where, subsequent to detaching said one film unit from said one end, it may be manually grasped and pulled so as to facilitate the removal of said film cassette from the camera.

6. A film assemblage for use with a camera of the self-developing type having a film chamber for locating a film cassette in position for the exposure of a film unit contained therein, a pair of elongate superposed motor driven rollers mounted adjacent the film chamber in position to receive therebetween an exposed film unit, as it is moved out of the film cassette, and continue its movement while simultaneously spreading a processing liquid across a layer of the exposed film unit to initiate the formation of a visible image therein, and a pair of electrical contacts connected to the motor, said film assemblage comprising:
a film cassette having means for defining an exposure opening through which a film unit is adapted to be exposed, means defining an egress opening through which an exposed film unit may be advanced in a direction toward the rollers, and at least one aperture through which the electrical contacts may extend so as to engage the terminals of a battery located within the film cassette;
a plurality of sheet-like members including several film units of the self-developing type located within said film cassette;
a battery including a pair of terminals located within said film cassette with said terminals being located in alignment with said at least one aperture; and
means coupled to the last of said sheet-like members to be moved from said film cassette via said egress opening for electrically insulating said terminals from the contacts after said last sheet-like member has moved out of engagement with the rollers.

7. A film assemblage as defined in claim 6 wherein said last of said sheet-like members is one of said film units.

8. A film assemblage as defined in claim 7 wherein said means coupled to said one film unit includes a first section attached to said one film unit and a second section of dielectric material, said second section being movable between said battery terminals and said at least one aperture in response to the movement of said one film unit and said first section through the rollers.

9. A film assemblage as defined in claim 7 wherein said means coupled to said one film unit includes an elongate strip having a first end portion releasably attached to said one film unit, an intermediate section, and a second end portion, said intermediate section including at least one opening therein located in alignment with said terminals and said at least one aperture, an electrically nonconductive section, and a slack portion located between said electrically nonconductive section and said first end portion whereby movement of said one film unit and said first end portion from said film cassette via said egress opening and through the motor driven rollers is transmitted to said intermediate section to first remove the slack from said slack portion and to then move said at least one opening out of alignment with said terminals while simultaneously moving said electrically nonconductive section between said terminals and said at least one aperture thereby stopping the flow of current from said battery to the camera's motor.

10. A photographic film assemblage comprising:
a film cassette having means for defining an exposure opening through which a film unit is adapted to be exposed, means defining an egress opening through which an exposed film unit is adapted to be advanced from the film cassette subsequent to exposure, and at least one aperture through which a pair of electrical contacts in a camera may extend so as to engage the terminals of a battery located within the film cassette;
a plurality of sheet-like members including several film units located within said film cassette;
a battery including a pair of terminals located within said film cassette with said terminals being located adjacent to and in alignment with said at least one aperture; and
means for coupling the last of said sheet-like members to be moved from said film cassette to said battery for moving said terminals out of alignment with said at least one aperture in response to the movement of said last sheet-like member from said film casette thereby preventing any electrical engagement between said terminals and the camera contacts.

11. A film assemblage as defined in claim 10 wherein said last of said sheet-like members is one of said film units.

12. A film assemblage for use with a camera of the self-developing type having a film chamber for locating a film cassette in position for the exposure of a film unit contained therein, a pair of elongate superposed motor driven rollers mounted adjacent the film chamber in position to receive therebetween an exposed film unit, as it is moved out of the film cassette, and continue its movement while simultaneously spreading a processing liquid across a layer of the exposed film unit to initiate the formation of a visible image therein, and a pair of electrical contacts connected to the motor, said film assemblage comprising:
a film cassette having means for defining an exposure opening through which a film unit is adapted to be exposed, means defining an egress opening through which an exposed film unit may be advanced in a direction toward the rollers, and at least one aperture through which the electrical contacts may extend so as to engage the terminals of a battery located within the film cassette;

a plurality of sheet-like members including several film units of the self-developing type located within said film cassette;

a battery including a pair of terminals located within said film cassette with said terminals being located in alignment with said at least one aperture; and means for coupling the last of said sheet-like members to be moved from said film cassette to said battery for moving said terminals out of alignment with said at least one aperture thereby preventing any electrical engagement between said terminals and the camera contacts.

13. A film assemblage as defined in claim 12 wherein said last of said sheet-like members is one of said film units.

14. A photographic film assemblage comprising:

a film cassette having means for defining an exposure opening through which a film unit is adapted to be exposed, means defining an egress opening through which an exposed film unit is adapted to be advanced from the film cassette subsequent to exposure, and at least one aperture though which a pair of electrical contacts in a camera may extend so as to engage the terminals of a battery located within the film cassette;

a plurality of sheet-like members including several film units located within said film cassette;

a battery including a pair of terminals located within said film cassette with said terminals being located adjacent to and in alignment with said at least one aperture; and means coupled to the last of said sheet-like members to be moved from said cassette via said egress opening when located within the camera for electrically insulating said terminals from the camera contacts and for shorting said terminals.

15. A film assemblage as defined in claim 14 wherein said last of said sheet-like members is one of said film units.

16. A film assemblage as defined in claim 15 wherein said means coupled to said one film unit includes a section of dielectric material having an electrical conductor mounted therein which is movable between said battery terminals and said at least one aperture in response to the movement of said one film unit through a predetermined distance relative to said film cassette.

17. A film assemblage as defined in claim 15 wherein said means coupled to said one film unit includes an elongate strip having a first portion comprised of electrically conductive and nonconductive superposed elements and a second portion having at least one opening therein which is originally located between said battery terminals and said at least one aperture so as to enable the camera contacts to electrically engage said battery terminals when said film assemblage is located within the camera, said elongate strip being movable in response to the movement of said one film unit through a predetermined distance to displace said at least one opening from its position between said battery terminals and said at least one aperture and to thereafter position said nonconductive element over said at least one aperture and said conductive element across said terminals.

18. A film assemblage for use with a camera of the self-developing type having a film chamber for locating a film cassette in position for the exposure of a film unit contained therein, a pair of elongate superposed motor driven rollers mounted adjacent the film chamber in position to receive therebetween an exposed film unit, as it is moved out of the film cassette, and continue its movement while simultaneously spreading a processing liquid across a layer of the exposed film unit to initiate the formation of a visible image therein, and a pair of electrical contacts connected to the motor, said film assemblage comprising:

a film cassette having means for defining an exposure opening through which a film unit is adapted to be exposed, means defining an egress opening through which an exposed film unit may be advanced in a direction toward the rollers, and at least one aperture through which the electrical contacts may extend so as to engage the terminals of a battery located within the film cassette;

a plurality of sheet-like members including several film units of the self-developing type located within said film cassette;

a battery including a pair of terminals located within said film cassette with said terminals being located in alignment with said at least one aperture; and means coupled to the last of said sheet-like members to be moved from said film cassette via said egress opening for electrically insulating said terminals from the contacts after said last sheet-like member has moved out of engagement with the rollers and for shorting said terminals.

19. A film assemblage as defined in claim 18 wherein said last of said sheet-like members is one of said film units.

20. A film assemblage as defined in claim 19 wherein said means coupled to said one film unit includes a first section attached to said one film unit and a second section of dielectric material having an electrically conductive element mounted thereon, said second section being movable between said battery terminals and said at least one aperture in response to the movement of said one film unit and said first section through the rollers to position said electrically conductive element in engagement with said terminals.

21. A film assemblage as defined in claim 19 wherein said means coupled to said one film unit includes an elongate strip having a first end portion releasably attached to said one film unit, an intermediate section, and a second end portion, said intermediate section including at least one opening therein located in alignment with said terminals and said at least one aperture, superposed electrically nonconductive and conductive sections, and a slack portion located between said superposed sections and said first end portion whereby movement of said one film unit and said first end portion from said film cassette via said egress opening and through the motor driven rollers is transmitted to said intermediate section to first remove the slack from said slack portion and to then move said at least one opening out of alignment with said terminals while simultaneously moving said superposed electrically nonconductive and conductive sections between said terminals and said at least one aperture such that said electrically nonconductive section covers said at least one aperture and said electrically conductive section is in engagement with said terminals thereby stopping the flow of current from said battery to the camera's motor and shorting said battery.

* * * * *